Figure 1:
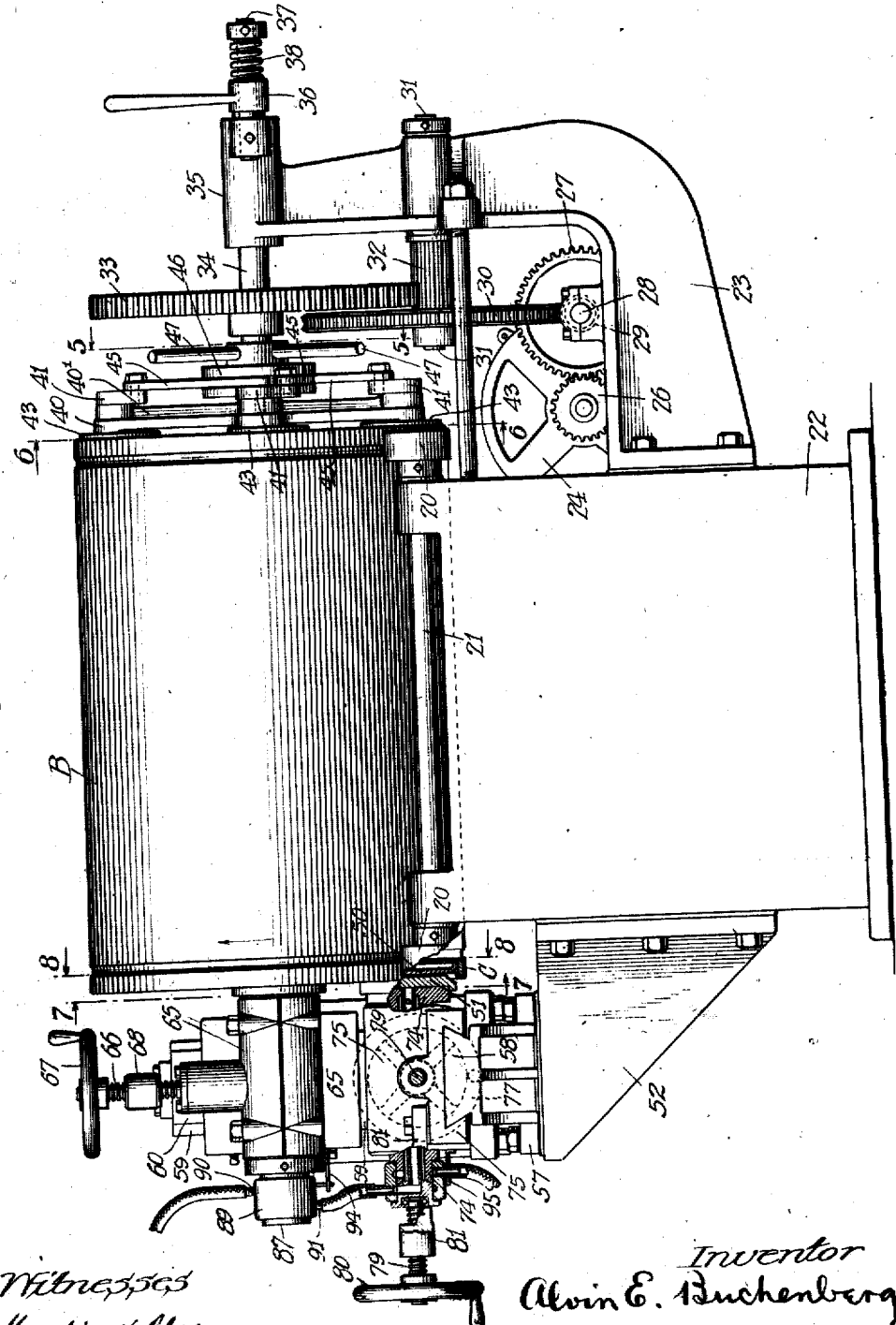

A. E. BUCHENBERG.
WELDING MACHINE.
APPLICATION FILED APR. 22, 1918.

1,322,479.

Patented Nov. 18, 1919.
7 SHEETS—SHEET 1.

Witnesses
Martin H. Olsen
Fidelis Maichen

Inventor
Alvin E. Buchenberg
By Rector Hibben Davis & Macauley
Attys

A. E. BUCHENBERG.
WELDING MACHINE.
APPLICATION FILED APR. 22, 1918.

1,322,479.

Patented Nov. 18, 1919.
7 SHEETS—SHEET 5.

Witnesses
Martin H. Olsen
Fidelis Maichen

Inventor
Alvin E. Buchenberg
By Rector Hibben Davis Macauley
Attys.

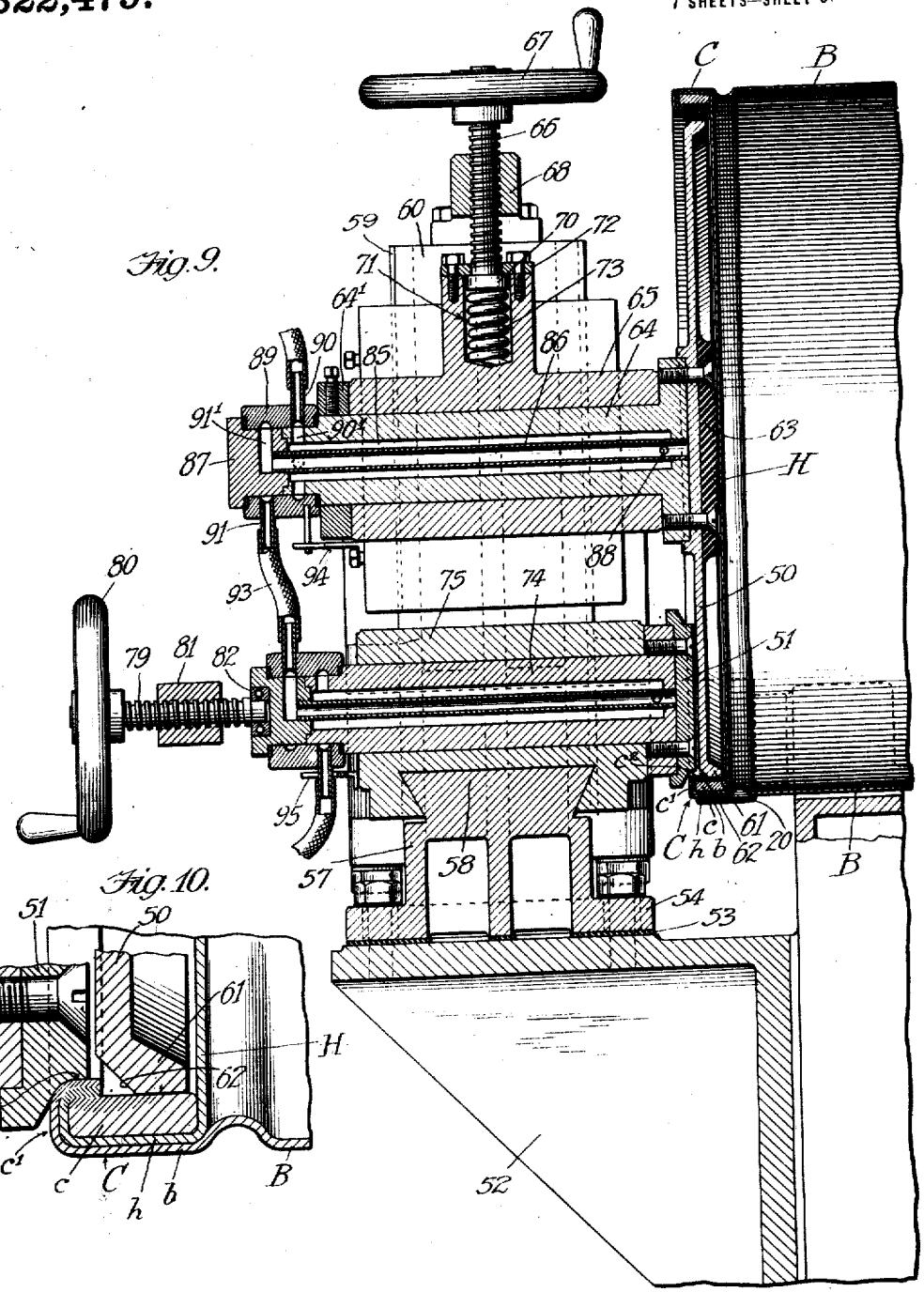

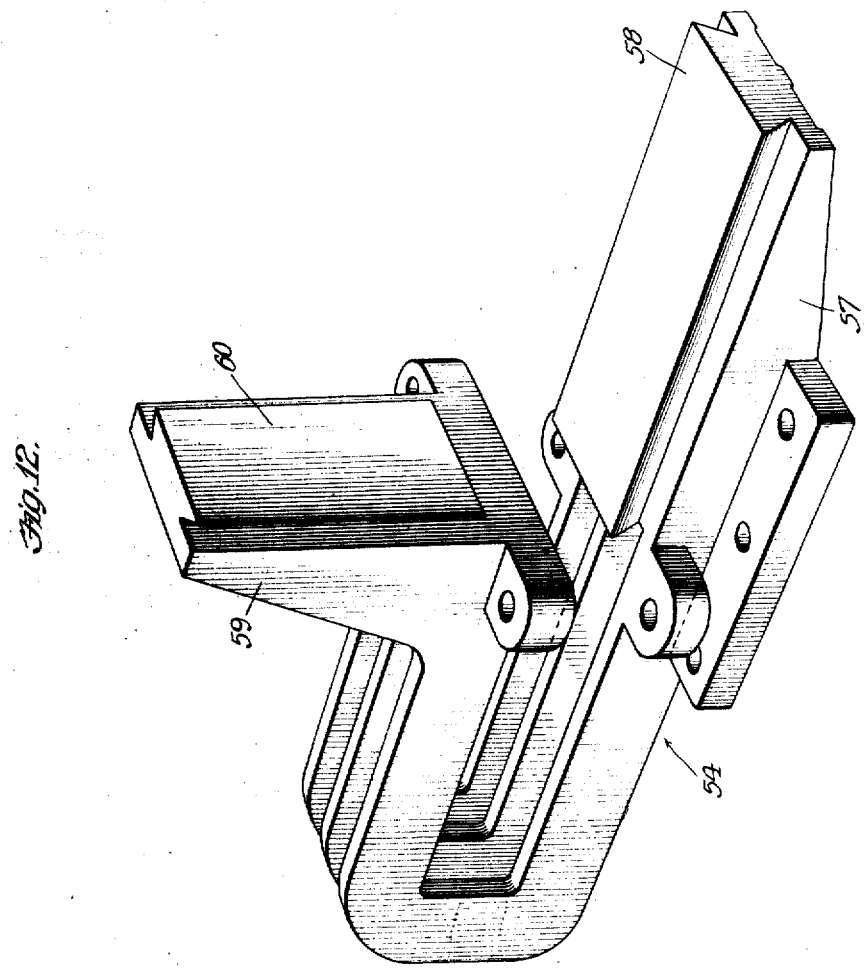

UNITED STATES PATENT OFFICE.

ALVIN E. BUCHENBERG, OF TOLEDO, OHIO, ASSIGNOR TO TOLEDO STEEL BARREL COMPANY, A CORPORATION OF OHIO.

WELDING-MACHINE.

1,322,479.  Specification of Letters Patent.  Patented Nov. 18, 1919.

Application filed April 22, 1918. Serial No. 229,976.

*To all whom it may concern:*

Be it known that I, ALVIN E. BUCHENBERG, a citizen of the United States, residing at Toledo, in the county of Lucas and State of Ohio, have invented certain new and useful Improvements in Welding-Machines; of which the following is a specification.

My invention has for its general object to provide a machine for the economical and efficient performance of welding operations and more particularly a chime-welding operation in the making of steel cylindrical containers, drums, or barrels.

The particular machine herein shown as an embodiment of my invention is designed, in its details, especially with reference to electrically welding the constituent parts of a steel barrel chime of the construction typically illustrated in Fig. 10, but it will be understood that many of its features and coordinations of parts are not restricted in their utility to operation upon this particular sort of barrel chime, and may have many and varied applications to continuous or traveling welding operations, particularly where the welded parts are given form by the welding electrodes and more especially where the stock to be welded is of circular shape. Furthermore, while for purposes of full disclosure I have illustrated in detail a machine in one form of embodiment only, it will be understood that many changes in details of mechanical construction and arrangement may be made without departure from the spirit and scope of my invention.

Among the more specific objects of my invention are to provide novel and efficient means for supporting, positioning, and rotating the work, so that the barrels may be handled expeditiously and easily; and to provide novel and desirable electrode construction and arrangement, including means for facile adjustment of the welding electrodes, and simple and efficient current supply means, all making for economical and efficient operating conditions.

A further specific object of the invention is so to dispose the electric contacts beween which the welding current passes as to secure a particularly effective direction of the current flow to the parts to be welded, and the best application of the pressure requisite for best effectuating the welding function and the finishing formation of the welded parts. Other objects will become apparent from the detailed disclosure hereinafter.

Figure 2:
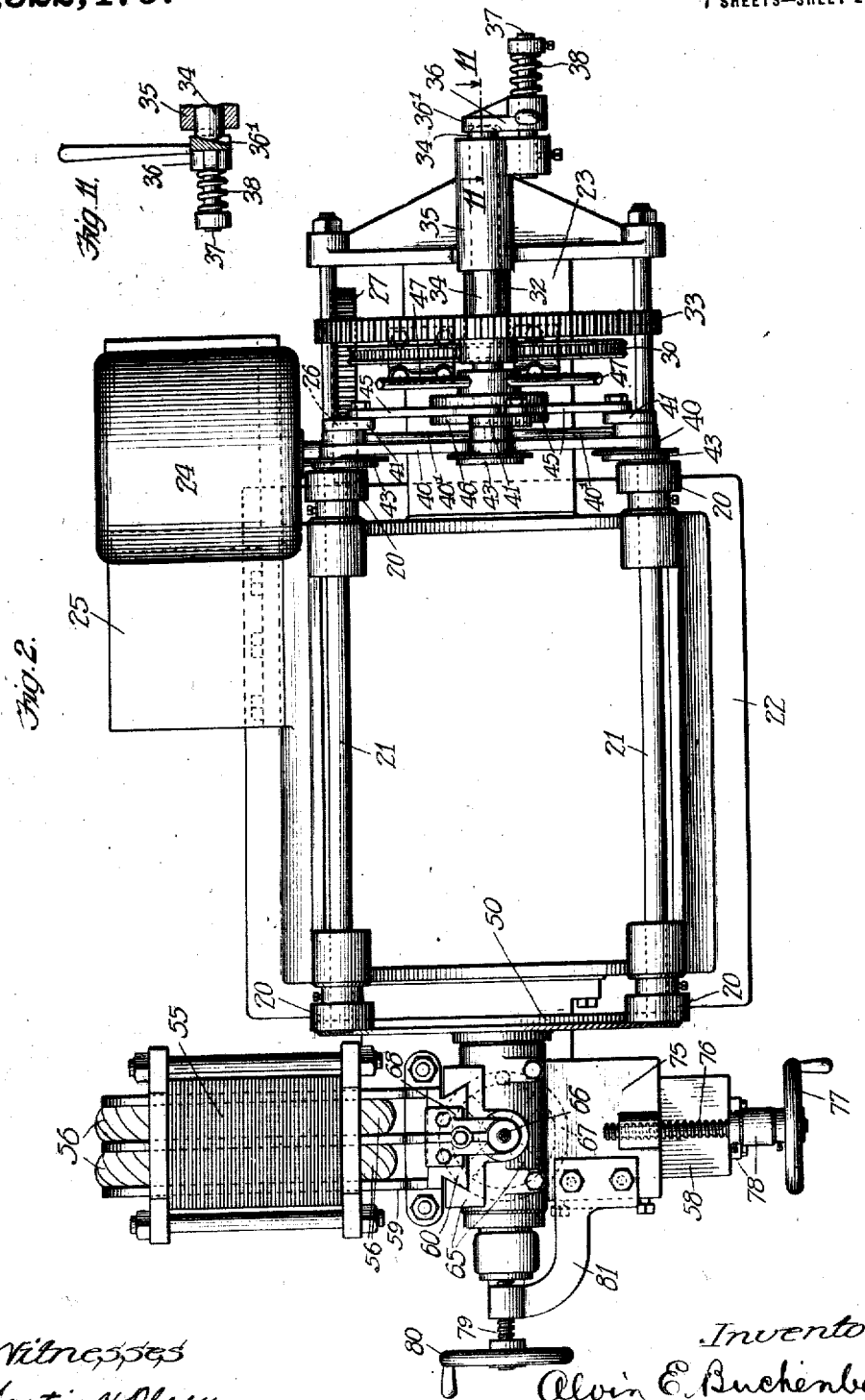
Figure 3:
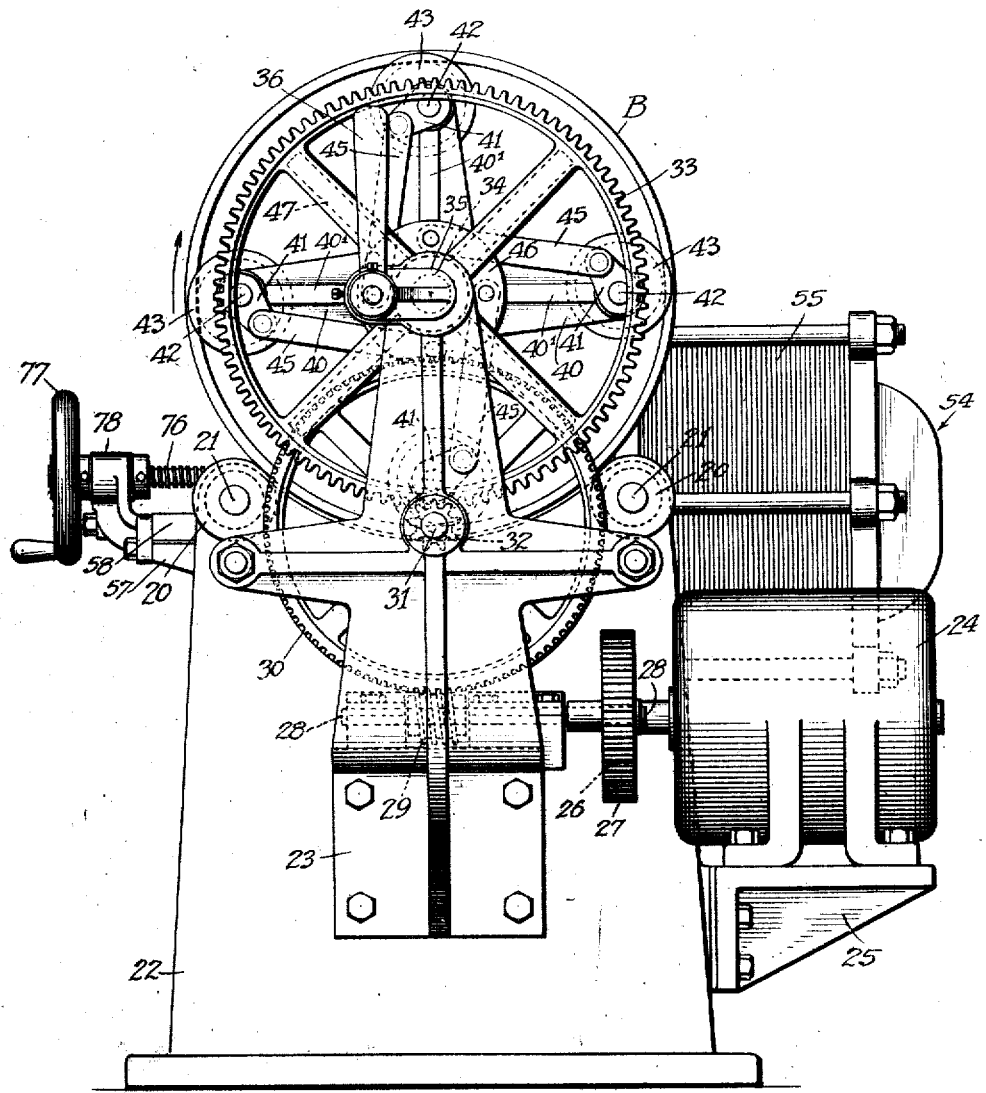
Figure 4:
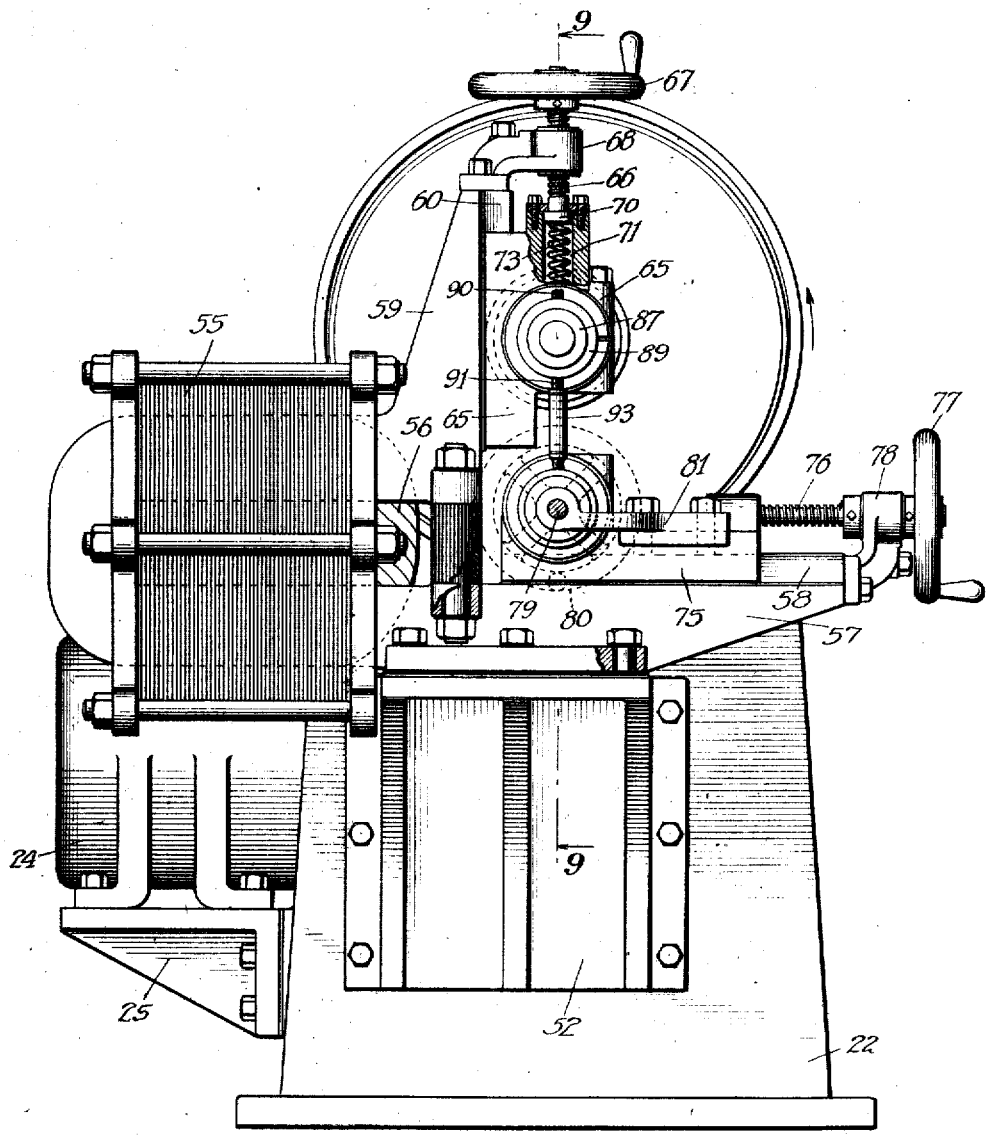
Figure 5:
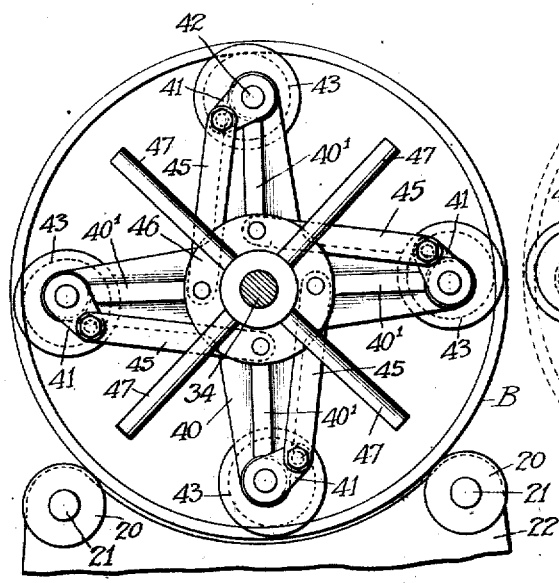
Figure 6:
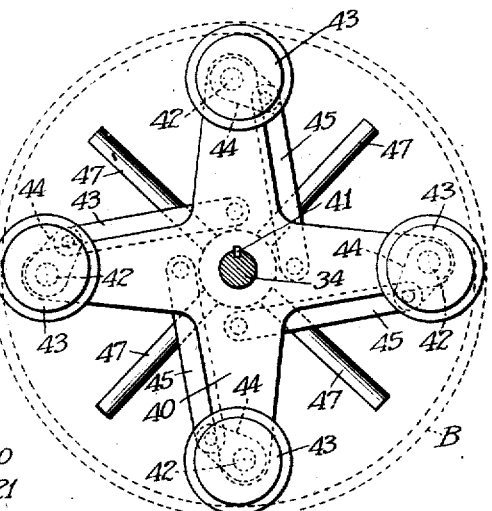

In the drawings, Figure 1 is a front elevation with the barrel in place; Fig. 2 is a plan view with the barrel removed; Fig. 3 is an elevation from the right end of Fig. 1; Fig. 4 a left-end elevation; Figs. 5, 6, 7 and 8 a later detail section on lines 5—5, 6—6, 7—7 and 8—8, respectively of Fig. 1; Fig. 9 is a vertical section on line 9—9 of Fig. 4; Fig. 10 is a detail of the barrel chime with the electrodes shown diagrammatically; Fig. 11 is a detail section on line 11—11 of Fig. 2, and Fig. 12 is a detail of the slide frame and transformer-secondary.

The barrel B, of the construction particularly illustrated, has a chime C formed by the rolling of rim $b$ of the body and the peripheral flange $h$ of the head H first radially inward as at $c'$ and then reëntrantly as at $c^2$ to partially infold a stout steel chime ring $c$ of oblong section, as shown in Fig. 10, the reëntrantly formed lip $c^2$ extending over the inner periphery of the chime ring for a minor portion only of the depth of said ring. It is highly desirable, in this form of construction among others, to weld together the reëntrantly-bent two-ply lip $c^2$ and the chime ring $c$, so that the several laminae shall be unified at this point, for strength and for absolute sealing of the head and body portions. This operation is performed by my machine, and kindredly continuous welding on moving work, particularly of circular contour, may be performed by the machine as herein described or by mechanical variants thereof adapted to suit changes in the work.

The stated welding operation I perform electrically and automatically in my machine wherein I provide for mounting the barrel for power rotation at suitable speed about its own axis under conditions affording pressure-resisting support for the exterior of the affected chime portion or part to be welded, and for applying to the parts to be welded a suitable electric current passing through the work between roll contacts, one of which exerts a welding and forming pressure upon the laminae, of the inturned lip $c^2$ within the arc of said lip that spans the points of barrel-support.

Figure 7:
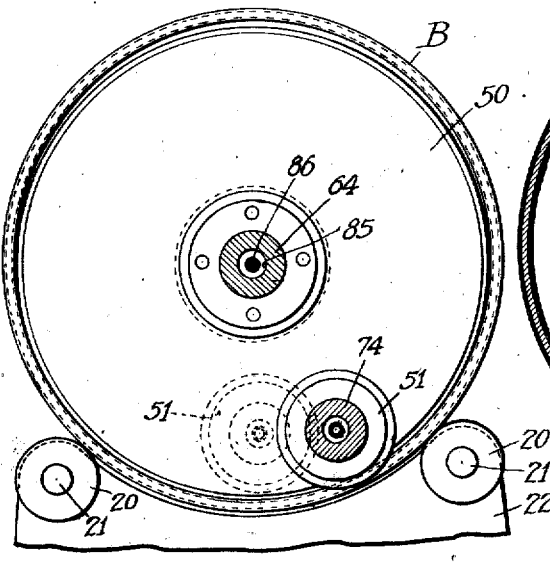
Figure 8:
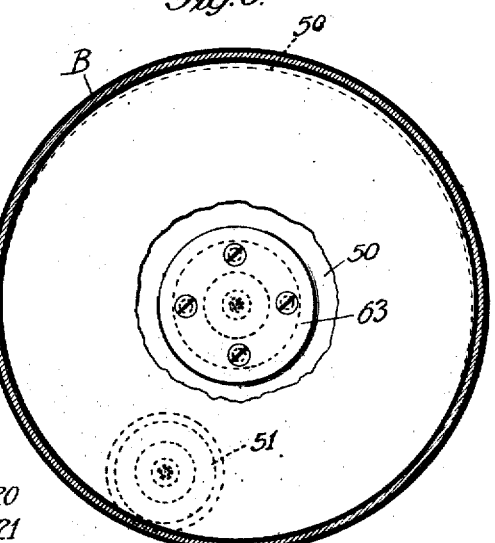

Specifically the barrel B is supported approximately horizontally in a cradle formed of rollers 20 mounted in two pairs on shafts 21, the rollers being spaced apart on the shafts by nearly the length of the barrel, and the shafts being mounted in a base 22 and spaced laterally, as shown in Fig. 7, to span an arc of approximately 90° or such other angle as will give adequate support to the barrel and will permit the included arc of its chime to dip materially below the lines of contact with the cradle-roller. This form of horizontal cradle facilitates handling of the heavy and bulky barrels but it is not vital to some of the features of my invention.

A bracket 23 at one end of the base 22 carries mechanism for engaging and power-rotating the barrel. Specifically an electric motor 24, mounted on a suitable plate 25 bolted to the back of the base, drives the barrel-rotating mechanism. The motor may be of any desired type susceptible of speed change by customary means (not shown), or other power mechanism may be substituted. In the specific driving mechanism shown a pinion 26 on the motor shaft drives gear 27 on countershaft 28 which carries a worm 29 (Fig. 3) driving worm wheel 30 on shaft 31 which has a pinion 32 driving a large gear 33 fast upon the barrel rotating shaft 34. This is merely a suitable speed-reducing train to insure adequately slow rotation of the barrel. Shaft 34 is mounted for axial movement in its bearing 35 on the bracket 23, and the pinion 32 is made long enough to keep it in mesh with wheel 33 as the latter is shifted axially with shaft 34. When in operation the shaft 34 is spring-pressed toward the left or welding end of the machine, by a spring-pressed handle-equipped latch-lever 36 that is rotatable and slidable on a stud 37 projecting from bracket 35 in parallelism to the shaft 34. Displacement of this lever toward the right is resisted by a strong spring 38 interposed between the lever and the end stop on the stud, and said lever has a lateral latch arm 36', which, as shown in Fig. 11, has a beveled lower edge and a flat upper portion for co-operation with the rounded end of shaft 34. Said lever may be easily rocked into or out of engagement with the end of the shaft, and in so rocking toward engaging position it cams the shaft 34 axially inward and yieldingly holds it against rightward displacement.

The shaft 34 is positioned to correspond with the axis of the barrel to be operated upon, and upon its left end it carries means constituting a clutch for firmly engaging one end of the barrel. Since the barrel shown has a chime the clutch is made to grip by expanding. The clutch devices herein shown comprise a head-member 40 in the form of a spider fixed as by key 41 (Fig. 6) to shaft 34, the four radiating arms of the spider, ribbed as at 40', affording bearing for respective crank shafts 42 which carry eccentrically the flanged clutch disks 43. In order that these disks 43 may be rocked in unison the crank arms 44 of the shafts 42 are connected to pivotal links 45, the inner ends of which are pivoted to a rotatable collar 46 loose on shaft 34 and equipped with radial handles 47. By turning the collar, by means of the handles, the disk crank shafts are simultaneously rocked so that, through the eccentricity of the disks 43, the barrel chime is grasped frictionally at four points, and it will be noted from the arrows on the various figures that the direction of rotation of the barrel during welding is such that the friction of shaft 34 upon the collar 46 (although desirably a minor quantity) tends to turn the collar in the direction to tighten the grip of the disks upon the barrel. In practice the frictional lock of the disks is adequate.

It will be understood, now, that the barrel, resting on its cradle of rollers 20, may be positively rotated at a selected uniform speed and maintained under an axial pressure of spring 38 tending to force it toward the left-end of the machine.

The left-end of the machine carries the welding mechanism to operate on the chime ring there exposed. This welding mechanism comprises two electrodes, preferably rollers, for contact respectively with two of the parts or laminæ to be welded, one of such rollers being preferably shaped to form the metal in making the weld. In the specific form shown, the welding devices comprise a large contact disk 50 and a small contact wheel 51, both arranged for free rotation frictionally caused by their contact with the barrel chime, these parts acting as terminal electrodes of the welding circuit. Respectively, disk 50 contacts with the chime ring $c$ to roll in a zone between the lip $c^2$ and the head H of the barrel, and roller 51 contacts with the inner periphery of the lip $c^2$ to roll in a zone axially separated from that of electrode 50 so that current flow between these terminals will follow a path through the three laminæ to be united. Also preferably the lines of contact of the disk and roller, respectively, with the affected chime, are circumferentially spaced, so that the current-heated area of the chime is an arc of appreciable extent, and by so directing the rotation of the barrel that the chime travels from disk-contact to roller-contact and so constructing the mechanism that roller 51 exerts the welding and forming pressure, it is insured that the metal is pre-heated best to condition it for the welding and forming operation. Specifically, the welding mechanism is carried on a suitable bracket 52 on the left-end of the machine and is thoroughly insulated therefrom. Upon the insulating plate 53 (Fig. 9) is mounted a slide yoke 54, that preferably is an integral part of, or electrically united with, the low-resistance secondary structure of the electric transformer 55. This transformer I prefer shall have its primary coils 56 arranged in recesses in the yoke-portion of structure 54, and its iron laminæ may be assembled in any suitable fashion, the electrical properties of such a structure being well-known, so that it suffices merely to comment that the secondary and all of its adjuncts in the path of current flow to the copper electrodes should be of copper designed for minimum resistance. The lower limb of yoke 54 is provided with a horizontal slide-dovetail 58 and the upper limb is provided with a vertical extension 59 having a slide dovetail 60. The large contact disk 50 is mounted in a slide to be described, working on the vertical limb 59 of the yoke and the small contact roller 51 is mounted in a slide on the horizontal extension 57.

Specifically contact disk 50, (Fig. 10) is a circular plate with a rim flange 61 beveled as at 62 to afford clearance for the lip $c^2$, the disk being of somewhat less diameter than the inside diameter of the chime ring so that when the disk is raised, through its slide mounting, it will free the barrel for easy axial removal. Centrally the disk may carry an insulating bearing block 63 so that should the parts be adjusted to let it make contact with the barrel head such contact may be mechanical only and without any detrimental electrical effect. The disk 50 is secured to a shaft 64 (Fig. 9) journaled in a slide block 65 that engages the dovetail 60 of the vertical slide. A holding collar 64' on shaft 64 holds it removably in its bearing. Vertical adjustment of the sliding block 65 is effected by turning the handle 67 of a screw 66 that passes through a suitably threaded cap-piece 68 of the yoke-member 59 and at its bottom carries a head 70 entering a spring recess 71 of the slide 65 and retained therein by the plate 72, so that said head 70 contacts constantly with the spring 73 housed in the recess 71. Under operating conditions the slide block 65 is screwed down until the disk 50 makes firm contact with the chime ring at the lowest point of the barrel periphery, and then the handle 67 is turned farther to put spring 73 under tension, so that the disk may ride up and down under any minor inequalities in the moving surface of the barrel chime with which it contacts.

Contact roller 51 is preferably shaped to act as a famer for the parts that it works on, in this specific instance being flanged like a car-wheel to engage the edge of the chime, but more particularly, in this instance, it should engage the inner perimeter of the chime, its engagement, or otherwise, with the rounded chime-edge being a matter of adjustment, as will hereafter be seen. Similarly to the electrode 50 it is secured to a shaft 74 journaled in a slide-block 75 that engaging the dovetail of the lower yoke extension 57 and the slide block may be shifted, transversely, by means of a screw 76 having a hand-wheel 77 passing through the bearing cap 78 of the slide structure. The elevation of this slide is such that the bottom of the roller 51 travels on a line traversing the barrel head above the lowest point of the chime ring and below the chord or intercept at which the bearing is afforded to the affected chime by rollers 20, as best shown in Fig. 7.

It is by virtue of this construction that the two contacts make their electrical connection with the chime structure at points separated circumferentially of the chime, so that the current in flow between the contacts through the interposed portion of the chime may preheat that portion which is approaching the pressure-exerting welding roller 51, which, in operation, is screwed tightly enough to bite materially into the metal of the heat-softened chime lip, exerting an adequate welding and forming pressure. Also by shifting the roller 51 so that its shaft is in vertical alinement with the shaft of the contact disk, the roller, as shown in Fig. 9, clears the chime ring and facilitates removal or insertion of the barrel. Of course when it is desired that the edge of the chime shall be acted on by the roller 51 the setting of the parts should differ from that which obtains when only the inturned lip is so acted on, and to accommodate this adjustment the shaft 74 is made movable axially in its bearing for adjustment by a screw 79 worked by handle 80, arranged in bracket 81 on the slide 75 and acting against the thrust-bearing 82 of the roller-shaft.

As a matter of refinement, I consider it desirable to water-cool the contacts, and to this end I make each of the shafts 64 and 74 hollow, and provide water supply means and baffling directive means for forcing a circulation of the cooling water from end to end of each shaft. Within the bore 85 of shaft 64 I mount a tube 86 secured at opposite ends to the shaft-wall and to a head 87, thus dividing the shaft into two concentric passages that communicate through apertures 88 at the inner end of the tube. A coupling ring 89, suitably packed, spans from shaft-end to head 87 and has ports 90, 91 communicating with interior channel grooves that open through passages 90', 91' in the shaft and head, respectively, to the concentric passages of the shaft. Identical provision is made with respect to the hollow shaft 74, and an electrically-insulated piping connection 83 is made between two ports of the two coupling rings, the remaining two ports of the respective rings having connection with intake and outlet piping of any suitable waterflow circulatory system. The coupling rings may be held against rotation by suitable brackets 94, 95, secured to the respective slide blocks.

In operating the machine, preparation is made for inserting a barrel into the empty cradle shown at Fig. 2 by adjusting the vertical slide block 65 to bring the contact disk 50 approximately co-axial with the barrel-position, and the horizontal slide-block 75 into vertical alinement with the other, so that the contact roller 51 will be in position above the lowest point of the chime. The lever 36 is rocked so its blade frees the barrel-rotating shaft 34 and the latter shaft is drawn outwardly to its limit of throw. Also handles 47 of the clutch are turned to retract eccentrics 43. When the barrel has been positioned in cradle-rollers 20 and pushed forward until stopped by the insulating plate 63 on the contact disk 50, or by the flange of contact-roller 51 (as the setting may provide) its chime to be operated upon will rest on the cradle-rollers 20 at the left-end of the machine and the barrel will be concentric with the operating shaft 34. Now the shaft, with its appurtenances, is pushed inward until the eccentric disks on the head or spider 40 lie within the chime ring; the latch-lever 35 is then thrown over, so that its beveled blade forces the shaft 34 toward the barrel and receives the shaft-end against the flat part of the blade, thereby putting the spring 38, which backs up the lever, under tension, and then handles 47 are turned to rock eccentrics 43 to clutching position. Now the contact disk 50 is brought vertically into engagement with the chime ring by screwing down its slide-block until spring 73 is under tension, and then the contact-roller 51 is moved laterally with its slide block until the roller engages the lip $c^2$ at a position within the arc between the cradle-rollers. When, now, the transformer primary is excited, current of low voltage but large volume flows between the electrodes, which are free to roll on the chime ring in their respective non-registering zones. The lateral pressure on the contact roller 50 may be increased by screwing out its slide block 75 until the roller exerts an adequate welding and forming pressure, rotation of the barrel being in proper direction so that the chime progresses in contact with disk 50 to roller 51, thus insuring that the metal to be welded will be preheated and brought to the pressure-receiving point in a softened condition. It will be understood, of course, that it is important that the electrodes make contact only with different laminæ respectively, and that such laminæ should be the extreme ones of such number as are to be welded so that current must pass through the several parts to be united.

Of course to remove the barrel the operations state are the reverse.

What I claim is:

1. A welding machine comprising in combination, means for supporting and rotating work that has a plurality of laminæ to be welded, a roller-electrode arranged to contact with one of said laminæ, means to produce a relative movement between the supporting means and said electrode to enable said electrode to exert a pressure tending to compact the laminæ, a second rolling electrode arranged to contact with another of said laminæ, and means for supplying current to said electrodes.

2. A welding machine comprising means for supporting and moving the work, a roller electrode opposing said supporting means, means for exerting pressure on said electrode, a second electrode spaced in rear of the first in the direction of work movement, and means to supply current to said electrodes.

3. A welding machine comprising a roller electrode shaped to give form to the work, means to support and move the work in contact with said electrode, means to produce relative displacement between said supporting means and electrode to create a pressure of said electrode on the work, a second electrode arranged for contact with the work in rear of said roller with reference to direction of work-movement, and means for supplying electric current to said electrodes.

4. In a welding machine, the combination of means for supporting and rotating circular work, said means including external bearing rollers, a plurality of rolling electrodes arranged for contact with different portions of the work, one of said electrodes working in pressure-opposition to the bearing rollers, means for bodily moving said electrode to vary the pressure, and means for current supply to said electrodes.

5. A machine for welding a reëntrantly bent chime-lip of a steel barrel or the like, comprising means for supporting and rotating a barrel, two rolling electrodes disposed for contact with the barrel chime in parallel, axially non-alining zones and on circumferentially non-registering lines, and means for supplying current to said electrodes.

6. A machine for welding the reëntrantly bent lip of a steel barrel or the like, comprising means for supporting and rotating a barrel, two rolling electrodes disposed for contact with the barrel chime in parallel, axially non-alining zones and on circumferentially non-registering lines, means for applying current to said electrodes, yielding means for applying contact maintaining pressure to one said electrode, and positive means for supplying welding pressure to the other of said electrodes.

7. In a machine for welding reëntrantly bent laminæ of a barrel chime, the combination of a support to position the barrel-chime against radial displacement, rotatable means to engage the barrel and turn it, rolling electrodes positioned to engage the inner perimeter of the chime, one of said electrodes disposed to contact with the reëntrant lip within the arc included between the points of support afforded by the cradle, and means for supplying current to said electrodes.

8. In a machine for welding reëntrantly bent laminæ of a barrel chime, the combination of a support to position the barrel-chime against radial displacement, rotatable means to engage the barrel and turn it, rolling electrodes positioned to engage the inner perimeter of the chime, one of said electrodes disposed to contact with the reëntrant lip within the arc included between the points of support afforded by the cradle, means for applying pressure to said electrodes, and means for supplying current to said electrodes.

9. In a welding machine of the character described, the combination of a frame, a shaft rotatable therein, expanding clutch means carried by said shaft to engage internally a barrel-chime, and electrical welding means for engaging and operating upon the opposite chime.

10. In a barrel chime-welding machine, the combination of a frame, a roller-cradle thereon, a horizontal shaft, means to rotate it, a head part carried by said shaft, barrel gripping means carried by said head part and outwardly displaceable to clutch within a barrel-chime, means for operating said clutch means, and electrical welding means carried by said frame arranged to act upon the opposite chime of the barrel.

11. In a machine of the character described, the combination of a barrel receiving cradle, a rotatable shaft, means to drive it, a head member carried by said shaft, eccentrically pivoted disks carried by said head-member, manual means for simultaneously oscillating said clutch disks about their pivotal axes to cause them frictionally to engage within a barrel-chime ring, and welding means disposed to operate upon the opposite chime ring of the barrel.

12. In a barrel-welding machine, the combination of a frame, a roller-cradle disposed approximately horizontally, a horizontal shaft at one end of the frame, means to rotate it, yielding means tending to displace said shaft axially inwardly, means carried by said shaft to engage the barrel, and welding means for coöperation with the chime at the other end of the barrel including a rolling pressure element adapted to engage the edge of the chime at said barrel end.

13. In a barrel-welding machine, the combination of a frame, a roller-cradle disposed approximately horizontally, a horizontal shaft at one end of the frame, means to rotate it, yielding means tending to displace said shaft axially inwardly, means carried by said shaft to engage the barrel, welding means for coöperation with the chime at the other end of the barrel including a rolling pressure element adapted to engage the edge of the chime at said barrel end, and means to adjust said pressure element axially of the barrel.

14. In a barrel-welding machine, the combination of a frame, rollers thereon constituting a substantially horizontal cradle, a horizontally-disposed shaft having a capability for axial displacement, clutch means carried by said shaft to engage the barrel supported in the cradle, spring means tending to force the shaft inward, means for rotating the shaft, and welding means disposed to operate upon the other chime of the barrel.

15. In an electric welding machine for welding laminæ of a barrel chime, the combination of means for supporting and rotating a barrel, a welding means comprising rolling electrodes disposed to act in parallel non-registering zones in contact with different laminæ of the barrel-chime, and means for moving the said contacts in their respective zones at an angle relative to each other.

16. In an electric welding machine of the class described, a combination of means for supporting and rotating a cylindrical container which has a laminated chime to be welded, an electrical welding means comprising a slide-frame having vertical and horizontal slides, slide-blocks on said frame, contact members carried by said slide-blocks for engagement with the chime in axially non-registering planes and on non-alining radii, and means for supplying electrical current to said contacts.

17. In a welding machine of the character described, a combination of means for holding and rotating a barrel that has a laminated chime, welding means for welding the laminæ of said chime comprising an electrical transformer having a secondary provided with vertical and horizontal slide frame extensions, slide blocks on said extensions, means for adjusting said slide-blocks thereon, and rolling contacts carried by said slide-blocks, arranged to coact with the chime in axially non-registering planes.

18. In a welding machine of the character described, a combination of means for holding and rotating a barrel that has a laminated chime, welding means for welding the laminæ of said chime comprising an electrical transformer having a secondary provided with vertical and horizontal slide frame extensions, slide-blocks on said extensions, means for adjusting said slide-blocks thereon, and rolling contacts carried by said slide-blocks arranged to coact in axially non-registering planes, one of said contacts being disposed to act upon the chime adjacent the end edge thereof and the other to act upon the inner surface of the chime relatively remote from said edge.

19. In a welding machine the combination of means for holding and turning a barrel that has a laminated chime, and means for welding said chime comprising two rolling contacts slidably mounted for movements at an angle to each other and arranged to contact with different laminæ of the chime, means for sliding said contacts and means for supplying current to said contacts.

20. In a welding machine, a cradle to receive a barrel, axially displaceable barrel gripping and turning means at one end of the cradle, and at the other end of the cradle chime-welding means movable to non-operative relation to the barrel position to permit insertion of the barrel in the cradle.

21. A welding machine comprising in combination a forming and welding electrode, means for exerting a pressure thereon, a second electrode, means for presenting the work in contact with and moving it with respect to said electrodes in pressure-resisting opposition to the first said electrode, and means for supplying current to said electrodes.

22. A welding machine comprising in combination a forming and welding electrode, means for exerting a pressure thereon, a second electrode, means for presenting circular work in contact with and rotating it with respect to said electrodes in pressure-resisting opposition to the first said electrode, and means for supplying current to said electrodes.

23. A welding machine comprising in combination means to support and rotate circular work, two electrodes disposed within the work circl on the same side of the work for contact with the work in different zones of work-rotation and means to supply current thereto.

24. A welding machine comprising in combination means to support and rotate circular work, two electrodes disposed within the work-circle for contact with the work in different circumferential points of work-rotation and means to supply current thereto.

25. A welding machine comprising in combination means to support and rotate circular work, two electrodes disposed within the work-circle for contact with the work in different zones and different circumferential points of work-rotation and means to supply current thereto.

ALVIN E. BUCHENBERG.